United States Patent [19]

Tsai

[11] Patent Number: 4,725,237

[45] Date of Patent: Feb. 16, 1988

[54] CHILDREN'S EDUCATIONAL APPARATUS

[76] Inventor: Lien S. Tsai, No. 22, Lane 52, Chung Ping Road, Tai Ping Hsiang, Tai Chung Hsien, Taiwan

[21] Appl. No.: 70,211

[22] Filed: Jul. 6, 1987

[51] Int. Cl.⁴ ............................................. G09B 3/02
[52] U.S. Cl. .................................... 434/327; 434/202
[58] Field of Search ................ 434/202, 327, 347, 348

[56] References Cited

U.S. PATENT DOCUMENTS

| | | | |
|---|---|---|---|
| 1,670,480 | 5/1928 | Pressey | 434/327 |
| 1,749,226 | 3/1930 | Pressey | 434/327 |
| 2,317,107 | 4/1943 | Oesch | 434/327 |
| 2,983,054 | 5/1961 | Twyford, Jr. | 434/327 |
| 4,033,051 | 7/1977 | Liu | 434/327 |

*Primary Examiner*—William H. Grieb

[57] ABSTRACT

A children's educational apparatus comprising a driving member and a control member. The driving member includes a driving roll and two driven rolls, all which rotate together. A set of cards is set on each of the driven rolls, cards in one set being printed with mathematical questions and cards in the other set being printed with the solutions corresponding to those questions. The control member includes pressing keys on a keyboard, each of which is marked with a number on the upper face thereof and connects to a keying arm. When pressing the keys on which correct members corresponding to solutions of the mathematical questions are marked, the keying arms will be forced to move, thus forcing a pushing element to push the driving roll to rotate, then changing the cards to the next one.

1 Claim, 5 Drawing Figures

CHILDREN'S EDUCATIONAL APPARATUS

BACKGROUND OF THE INVENTION

This invention relates to a children's educational apparatus which provides educational functions from a toy.

Childhood education is considered more and more important at present. Therefore, many kinds of children's educational apparatus or educational toys have been manufactured for this purpose. The children's educational apparatus of this invention comprises hundreds of cards whereon mathematical equations, figures and numbers are printed. The child plays on a keyboard to control the change of the cards.

SUMMARY OF THE INVENTION

A primary object of this invention is to provide a children's educational apparatus to help children to become acquainted with mathematical computations and figures from games.

Further objects and advantages of this invention will become apparent as the following description proceeds, and the features of novelty which characterize the invention be pointed out with particularity in the claims annexed to and forming a part of this invention.

DETAILED DESCRIPTION OF THE INVENTION

Figure 1:
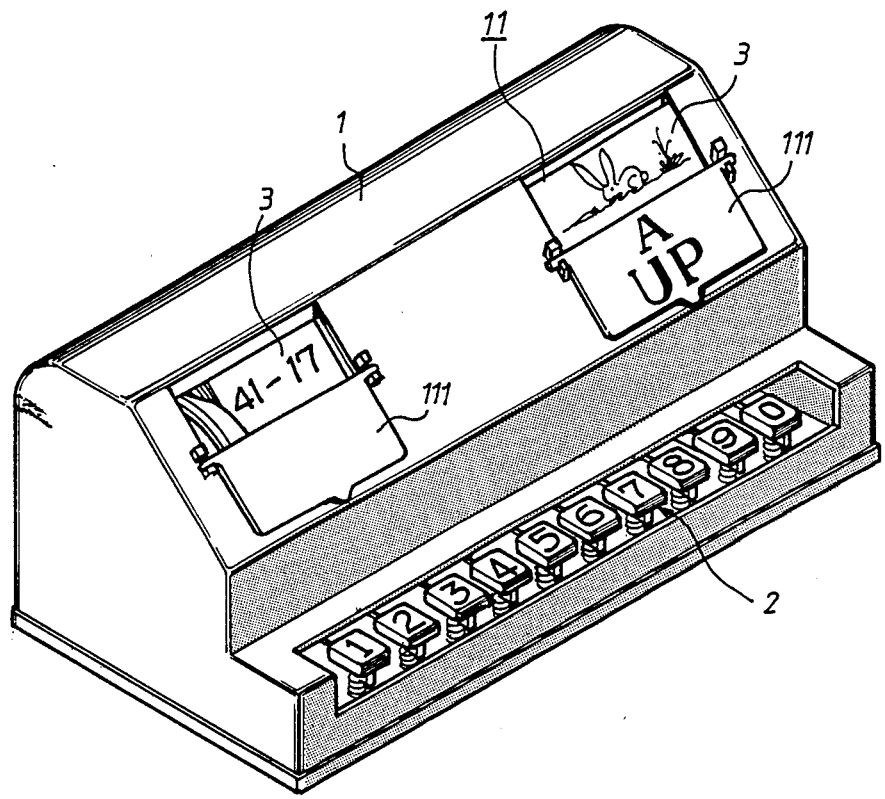
FIG. 1 shows a perspective view of this invention.

As can be seen in FIG. 1, the children's educational apparatus of this invention comprises a housing 1, a keyboard 2 and two sets of cards 3.

Figure 2:
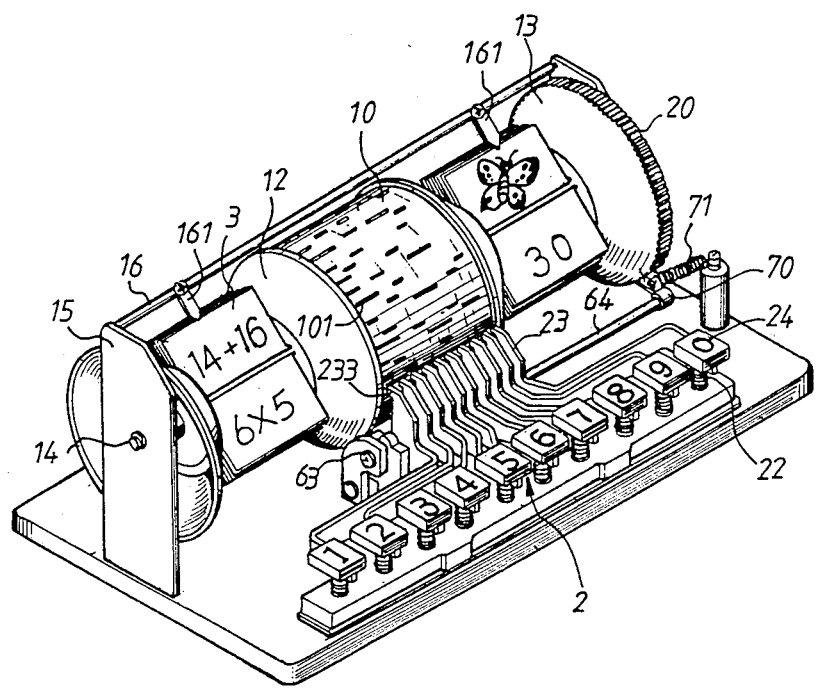
FIG. 2 shows a perspective view of the inside of this invention excluding the housing thereof.

Accompanying FIG. 2, the inner view of the children's educational apparatus of this invention is shown. It can be seen that the two sets of cards 3 are set on two driven rolls 12, 13 which are aligned on the same axis with a driving roll 10.

Each set of cards 3 which are set on the circumferences of the driven roll 12 and 13 is composed of hundreds of cards. As shown in the figures, each set of cards 3 shows two sheets of cards at a time. The left set shows two mathematical questions with the same solution (i.e. the solution of a question on a positive face of one card should be equal to that on a negative face of the former adjacent card) and the solution is shown on one card of the right set. Another card of the right set prints a figure showing an object (i.e. the card of the right set has one face being a member and the other face being a figure). Further, two coverings 111 are installed on the outside of each of the representing windows 11 of the housing 1 and each of which is substantially pivoted at the middle of both sides of the representing window 11 so that the covering 111 is movable up or down for hiding the upper or lower card. Generally, the right covering 111 covers that card with a solution and the left covering 111 is set for insuring one question at a time.

Figure 3:
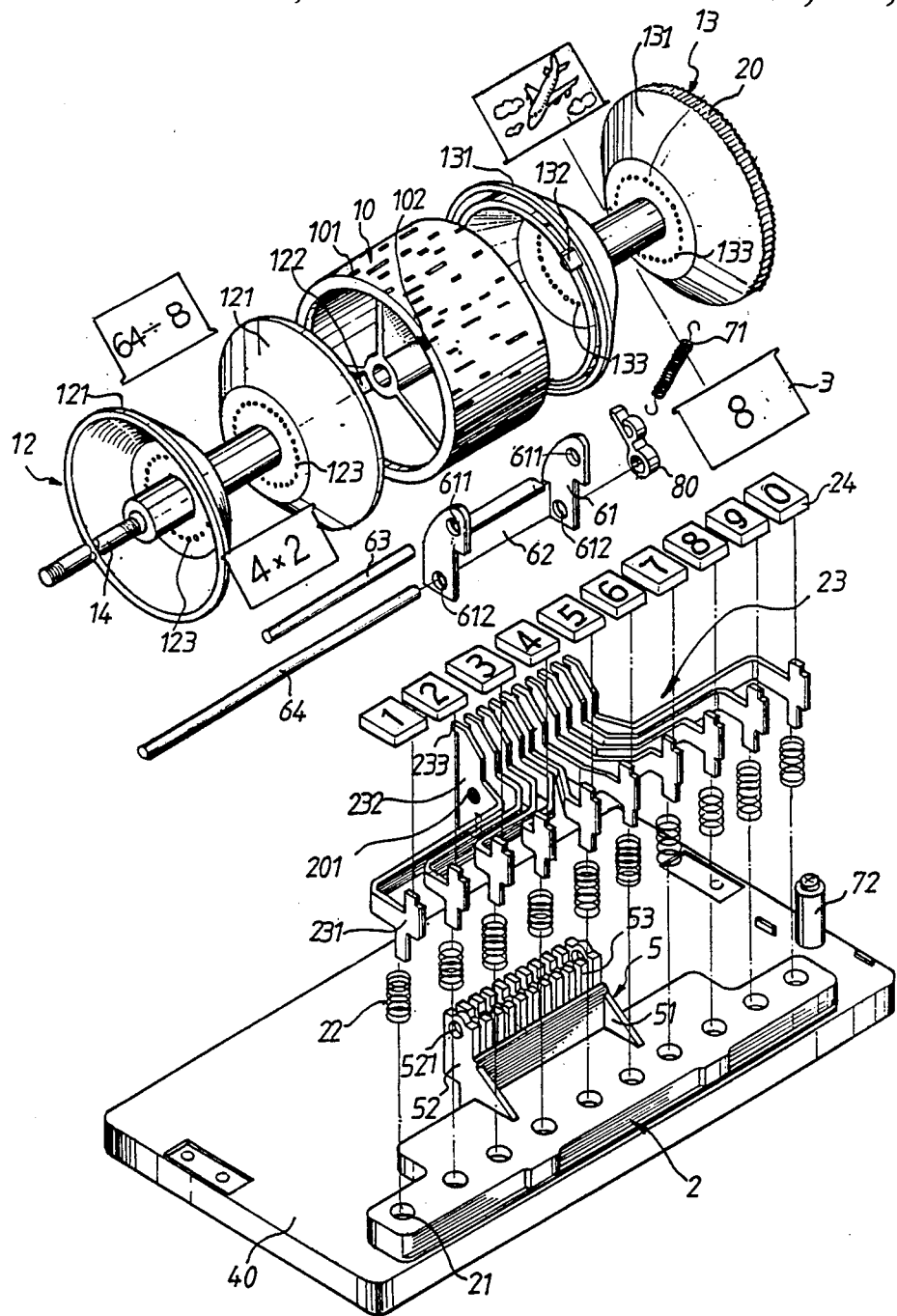
FIG. 3 shows an exploded view of the inside of this invention.

Now refer to FIG. 2 and FIG. 3. Each of the driven rolls 12 and 13 is cylindrical and further comprises two frusto-cone hollow bodies 121 or 131 installed on two ends of the driven roll 12 or 13 with the surfaces with smaller diameters of the two frusto-cone bodies 121, 131 facing toward each other. Further, a plurality of small holes 123 and 133 are provided along the circumference of surface with smaller diameter of each frusto-cone body 121, 131 respectively for hanging the sheets of cards 3 between the two frusto-cone bodies 121 and 131. One or more engagement blocks 122 or 132 are set on the periphery of the surface of each frusto-cone body 121 (or 131) of each driven roll 12 (or 13) near the driving roll 10. The engagement blocks 122 or 132 engage with the recesses 102 of the peripheries of the driving roll 10. Then a rotating axle 14 is inserted in the central holes of the driving roll 10 and the driven rolls 12, 13 and two ends of the axle 14 are fixed respectively to two plates 15. Between the two plates 15, a lateral rod 16 connects to the top of each plate 15. Further, two chips 161 are installed on the lateral rod 16, corresponding to the respective set of cards, which slightly touch the upper card for preventing the upper card from turning down. Especially note that the outer circumference 20 of one frusto-cone body 131 of the driven roll 13 is toothed. The characteristics of the toothed circumference 20 will be described hereinafter.

The surface of the driving roll 10 is set with a plurality of protuberances 101. The arrangement of the protuberances 101 is for corresponding to the solutions of the corresponding sheets of cards 3.

The children's educational apparatus of this application further comprises an installation plate 40, a keyboard 2, a fixed bracket 5 and an unfixed bracket 6. The keyboard 2 has ten holes 21 each of which is inputed in order a spring 22, a keying arm 23 and a pressing key 24. Each pressing key 24 is signed a number 0–9 respectively. The spring 22 is set so as to provide the pressing key 24 a restoring force.

The fixed bracket 5 is installed along the front edge of the keyboard 2 with two triangular extending portions 51 of the fixed bracket 5 lying on the keyboard 2. The fixed bracket 5 comprises two side walls 52 and ten U-shaped longitudinal blocks 53 installed therebetween. At the corresponding positions of the side walls 52, a hole 521 is set on each of the side walls 52 which is aligned with the U-shaped blocks 53. The unfixed bracket 6 comprises two arc walls 61, therebetween has a lateral plate 62 which extends from the middle of the arc walls 61 to the bottom thereof. Further, each of the two arc walls 61 has an upper hole 611 and a lower hole 612. As the width between the two arc walls 61 of the unfixed bracket 6 is little larger than than between the two side walls 52 of the fixed bracket 5, the unfixed bracket 6 sleeves on the fixed bracket 5.

The keying arms 23 each has one end 231 combined with the spring 22 inserted in the hole 21 as mentioned hereinbefore. The other end 232 of the keying arms 23 are inserted respectively in the space between each U-shaped longitudinal block 53. The end 232 of the keying arm 23 has a hole 201 and a knocker 233 extending from the top thereof. Then, since the holes 521, 611 and 201 are aligned, inserting a pin 63 therethrough to engage the unfixed bracket 6, the fixed bracket 5 and the keying arms 63 together.

Figure 4:
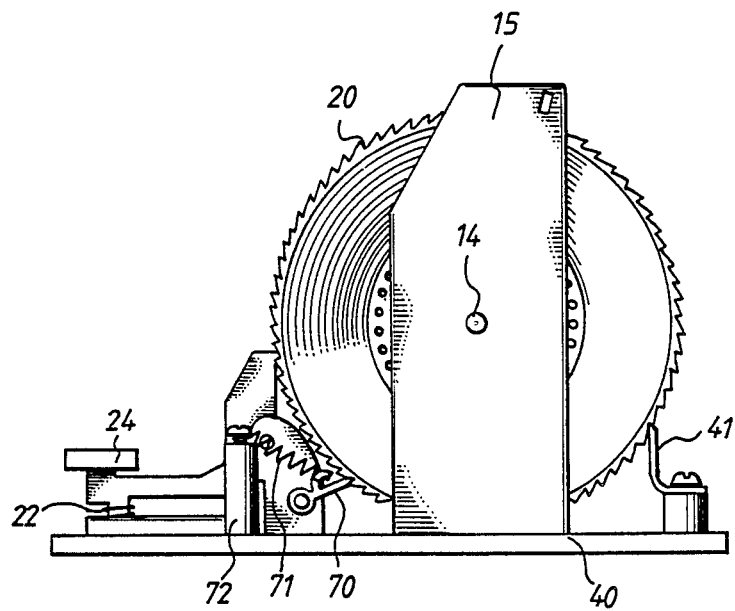
FIG. 4 shows a toothed circumference being urged to rotate by a pushing element in accordance with the present invention.
Figure 5:
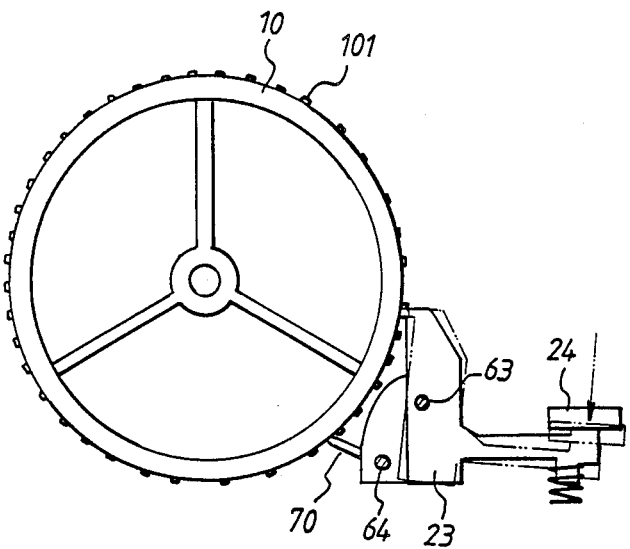
FIG. 5 shows the motion of the keying arm of this invention when a key is pressed.

Now referring to FIG. 4 and FIG. 5, it can be seen that the knocker 233 of the keying arm 23 contacts with the protuberances 101 of the driving roll 10. Further, a driving pin 64 passes through the lower holes 612 of the unfixed bracket 6 and one end of the driving pin 64 is connected with a pushing element 70 (as shown in FIG. 4). The pushing element 70 contacts with the toothed circumference 20 of the driven roll 13 for pushing the toothed circumference 20 when activated. Once keying the pressing key 24, the keying arm 23 will jump back pivotally about the pin 63 and accordingly, the driving pin 64 will be simultaneously pushed towards the toothed circumference 20 so as to cause the driven roll 13, together with the driving roll 10 and the driven roll 12, rotated a tooth, Note that the arrangement of the protuberances 101 of the driving roll 10 are dependent on the solutions of the mathematical questions on the cards correspondingly. That is, for example, if the solution on the left set is a number 30, then each of the positions on the driving roll 10 corresponding to the pressing keys marked 3 and 0 is set with a protuberance. Before pressing correct keys 24, each of corresponding knockers 633 thereof is right beneath the corresponding protuberances 101 and will block the driving roll 10 from being turned downwards. Therefore, if all pressing keys 24 marked with correct numbers are simultaneously pressed, the corresponding keying arms 63 will pivot back, so that the pushing element 70 can easily push the toothed circumferance 20 to change the cards 3 to the next question and solution. Further, the pushing element 70 connects to a spring 71 which is fixed on a fixed rod 72 to provide a restoring force to return the pushing element 70 after each movement. Additionally, the installation plate 40 further comprises a block 41 on the back of the toothed circumferance 20 for insuring the toothed circumferance 20 to rotate in a pre-determined direction.

According to the description mentioned above, the inventiveness of this invention should be understood very well. Further, as the presenting cards include mathamatical computations and drawings, the children's educational apparatus of this invention is sure to have educational and amusing functions.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:
1. A children's educational apparatus comprising:
(a) a housing;
(b) a driving roll and two driven rolls; each of said driven rolls having two frusto-cone bodies installed on two ends thereof with a surface having smaller diameter facing towoard each other; an outer frusto-cone body of either said driven roll having a toothed circumferance; a plurality of holes being provided on said surfaces respectively for hanging a set of cards therebetween; a first set of said cards each having a mathematical question on both faces thereof and a second set of said cards each having a figure printed on one face thereof and a solution corresponding to said first set of cards printed on the other face thereof; two coverings being set on said housing at positions outside of said two set of cards; said driving roll having a plurality of protuberances arranged corresponding to the solution of a mathematical question printed on said cards; said driving roll and said driven rolls being engaged together and being inserted a pin therethrough so that said three roller rotates at the same time;
(c) a keyboard set on an installation plate, said keyboard having ten holes in each of which a spring, an end of a keying arm and a pressing key are in order inserted; the other end of said keying arm having a hole and a knocker extending out from the top of said other end of said keying arm; said other end of said keying arm being put in a fixed bracket installed on said keyboard; said fixed bracket having U-sapaed blocks installed between two side walls thereof; each side wall having a hole; and
(d) a U-shaped unfixed bracket having two arc walls, each having an upper hole and a lower hole; said U-shaped unfixed bracket sleeving on said fixed bracket and said upper hole of said U-shaped unfixed bracket and said holes of said fixed bracket and said hole of said keying arm respectively being inserted through with a pin; another driving pin passing through said lower holes of said walls of said U-shaped unfixed bracket and one end of said driving pin being connected with a pushing element; said pushing element contacting with said toothed circumference of said driven roll; a spring connecting to the other end of said pushing element so as to provide a restoring force for said pushing element; a block being set on said installation plate for insuring said toothed circumference to rotate in only one direction.

* * * * *